(12) United States Patent
Acharya et al.

(10) Patent No.: US 11,641,149 B2
(45) Date of Patent: May 2, 2023

(54) ELECTRICAL MACHINES, LAMINATIONS, AND METHODS OF MAKING THE SAME

(71) Applicant: Hamilton Sundstrand Corporation, Charlotte, NC (US)

(72) Inventors: Ranadip Acharya, Rocky Hill, CT (US); Tahany I. El-Wardany, Vernon, CT (US); Colette O. Fennessy, West Hartford, CT (US); Joseph Kenneth Coldwate, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 49 days.

(21) Appl. No.: 17/321,321

(22) Filed: May 14, 2021

(65) Prior Publication Data
US 2021/0359581 A1 Nov. 18, 2021

Related U.S. Application Data

(60) Provisional application No. 63/025,884, filed on May 15, 2020.

(51) Int. Cl.
*H02K 15/02* (2006.01)
*B33Y 10/00* (2015.01)
(Continued)

(52) U.S. Cl.
CPC ........... *H02K 15/024* (2013.01); *B22F 10/28* (2021.01); *B33Y 10/00* (2014.12); *B33Y 80/00* (2014.12);
(Continued)

(58) Field of Classification Search
CPC .. B22F 2301/10; B22F 2301/35; B33Y 10/00; B33Y 80/00; H02K 1/02; H02K 1/16; H02K 15/02; H02K 15/024; H02K 15/0407; H02K 15/105; H02K 3/02; H02K 3/24; H02K 3/26; H02K 3/30; H02K 3/34; H02K 3/345
(Continued)

(56) References Cited

U.S. PATENT DOCUMENTS 4,187,441 A * 2/1980 Oney ..................... H02K 21/24
310/112
4,211,944 A * 7/1980 Haller .................... H02K 11/33
310/72
(Continued)

FOREIGN PATENT DOCUMENTS

GB 2570927 A 8/2019

OTHER PUBLICATIONS

Extended European search report issued in corresponding EP application No. 21174180.6, dated Oct. 8, 2021 (10 pages).

*Primary Examiner* — Rashad H Johnson
(74) *Attorney, Agent, or Firm* — Locke Lord LLP; Daniel J. Fiorello; Scott D. Wofsy

(57) ABSTRACT

An electrical machine stator can include a stator core having a stator core shape and made of a core material, a plurality of windings disposed in the stator core and made of a conductive material, and an insulative material surrounding the plurality of windings and configured to electrically insulate each winding from each other adjacent winding, and/or to insulate one or more of the windings from the stator core. The insulative material can be an amorphous metal.

17 Claims, 9 Drawing Sheets

(51) Int. Cl.
  *B33Y 80/00* (2015.01)
  *B22F 10/28* (2021.01)
  *H02K 1/02* (2006.01)
  *H02K 1/16* (2006.01)
  *H02K 3/02* (2006.01)
  *H02K 3/24* (2006.01)
  *H02K 3/26* (2006.01)
  *H02K 3/30* (2006.01)
  *H02K 3/34* (2006.01)
  *H02K 15/04* (2006.01)
  *H02K 15/10* (2006.01)

(52) U.S. Cl.
  CPC ............... *H02K 1/02* (2013.01); *H02K 1/16* (2013.01); *H02K 3/02* (2013.01); *H02K 3/24* (2013.01); *H02K 3/26* (2013.01); *H02K 3/30* (2013.01); *H02K 3/345* (2013.01); *H02K 15/0407* (2013.01); *H02K 15/105* (2013.01); *B22F 2301/10* (2013.01); *B22F 2301/35* (2013.01)

(58) Field of Classification Search
  USPC .............................. 310/179, 184, 198, 208
  See application file for complete search history.

(56) References Cited

U.S. PATENT DOCUMENTS

| | | | |
|---|---|---|---|
| 9,419,502 | B2 | 8/2016 | Veronesi et al. |
| 2014/0035423 | A1* | 2/2014 | Veronesi ............... B33Y 10/00 156/60 |
| 2015/0076951 | A1 | 3/2015 | Lynch et al. |
| 2017/0063183 | A1 | 3/2017 | Shrestha et al. |
| 2017/0252816 | A1 | 9/2017 | Shim et al. |
| 2017/0266728 | A1* | 9/2017 | Johnson ............... B22F 12/55 |
| 2018/0122541 | A1 | 5/2018 | Chou et al. |
| 2019/0348894 | A1 | 11/2019 | Huang et al. |
| 2020/0014287 | A1 | 1/2020 | Bittner et al. |
| 2020/0028390 | A1 | 1/2020 | Klassen et al. |

* cited by examiner

ELECTRICAL MACHINES, LAMINATIONS, AND METHODS OF MAKING THE SAME

CROSS-REFERENCE TO RELATED APPLICATIONS

This application claims priority to and the benefit of U.S. Provisional Application No. 63/025,884, filed May 15, 2020, the entire contents of which are herein incorporated by reference in their entirety.

FIELD

This disclosure relates to electrical machines, laminations, and methods of making the same.

BACKGROUND

Traditional electric machines (e.g., motors and/or generators) use silicon, plastic, and polymer as insulators, where their resistivity varies from about 640 Ohm-m to about $10^{16}$ Ohm-m. Insulation resistance of plastics falls off at a temperature beyond 250 degrees C. and the presence of fillers in the polymer affect its volume resistivity.

Such conventional methods and systems have generally been considered satisfactory for their intended purpose. However, there is still a need in the art for improved electrical machines, laminations, and methods of making the same. The present disclosure provides a solution for this need.

SUMMARY

An electrical machine stator can include a stator core having a stator core shape and made of a core material, a plurality of windings disposed in the stator core and made of a conductive material, and an insulative material surrounding the plurality of windings and configured to electrically insulate each winding from each other adjacent winding, and/or to insulate one or more of the windings from the stator core. The insulative material can be an amorphous metal.

In certain embodiments, the amorphous metal can be a bulk metallic glass (BMG). The BMG can be amorphous steel, for example.

The stator core shape can define a plurality of apertures. Each aperture can contain the plurality of windings therein, for example.

In certain embodiment, the core material can be or include steel or steel alloy. Any other suitable material for the core material is contemplated herein.

In certain embodiments, the conductive material can be or include copper. Any other suitable conductive material is contemplated herein.

In accordance with at least one aspect of this disclosure, a method can include additively manufacturing at least one electrical machine stator layer having a stator core portion having a stator core shape and made of a core material, a plurality of conductive material portions, and an electrically insulative material surrounding each conductive material portion to electrically isolate the plurality of conductive material portions from each adjacent conductive material portion and/or to isolate one or more of the conductive portions from the core material. Additively manufacturing can include using a directed energy deposition system comprising a plurality of nozzles connected to a plurality of build materials.

The method can include controlling a proportion of the plurality of build materials output from each nozzle and/or an energy application setting during additive manufacturing to create the core material, the conductive material portions, and the insulative material. The insulative material, the core material, and the conductive material can be any suitable material as disclosed herein (e.g., as described above).

In accordance with at least one aspect of this disclosure, an electrical machine lamination can include a stator core portion having a stator core shape and made of a core material, a plurality of conductive portions disposed in the stator core portion and made of a conductive material, and an insulative material surrounding the plurality of conductive portions and configured to electrically insulate each conductive portion from each adjacent conductive portion, and/or to insulate each conductive portion from the stator core portion. The insulative material can be an amorphous metal. The insulative material, the core material, and the conductive material can be any suitable material as disclosed herein (e.g., as described above).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
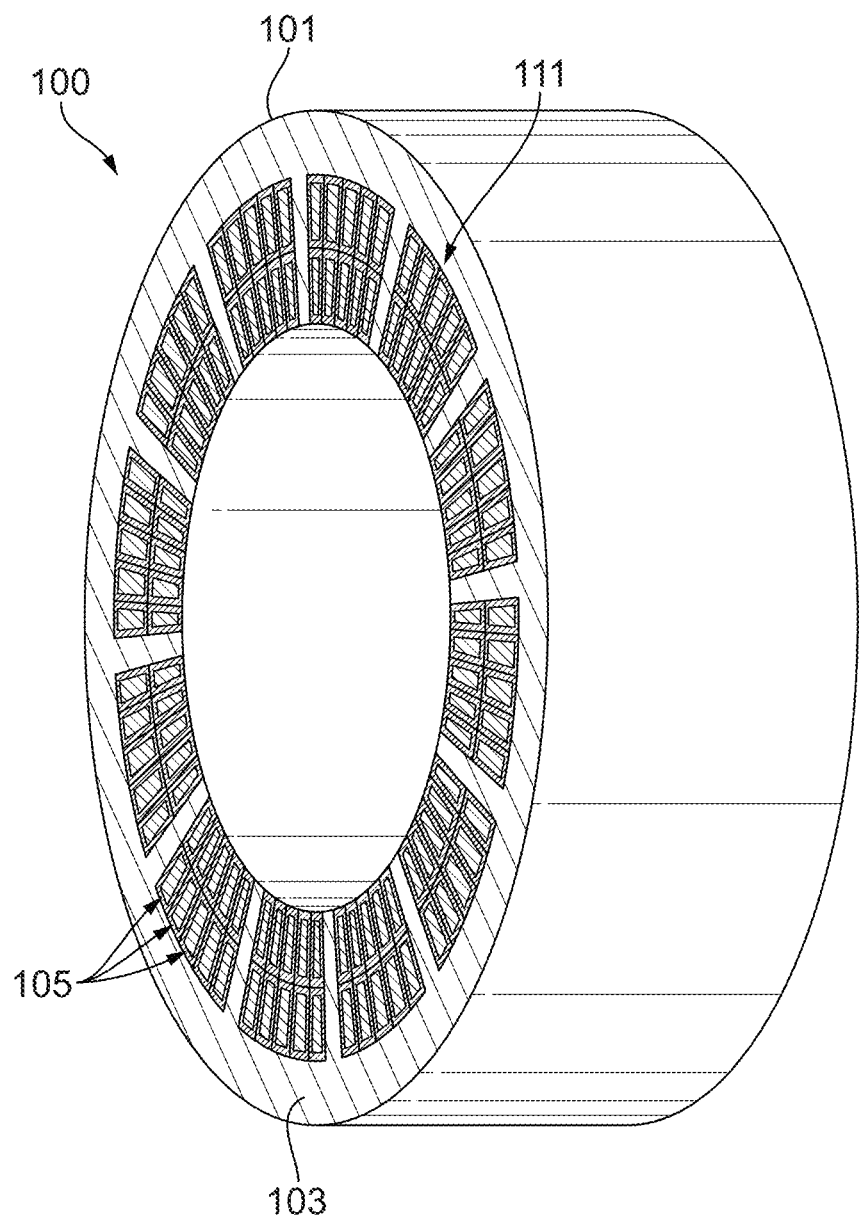
FIG. 1 is a perspective view of an embodiment of an electrical machine stator in accordance with this disclosure.

Reference will now be made to the drawings wherein like reference numerals identify similar structural features or aspects of the subject disclosure. For purposes of explanation and illustration, and not limitation, an illustrative view of an embodiment of a stator in accordance with the disclosure is shown in FIG. 1 and is designated generally by reference character 100. Other embodiments and/or aspects of this disclosure are shown in FIGS. 2-5.

U.S. patent application Ser. No. 13/566,615, filed Aug. 3, 2012, and corresponding U.S. Pat. No. 9,419,502 are incorporated by reference herein in their entirety.

Figure 2:
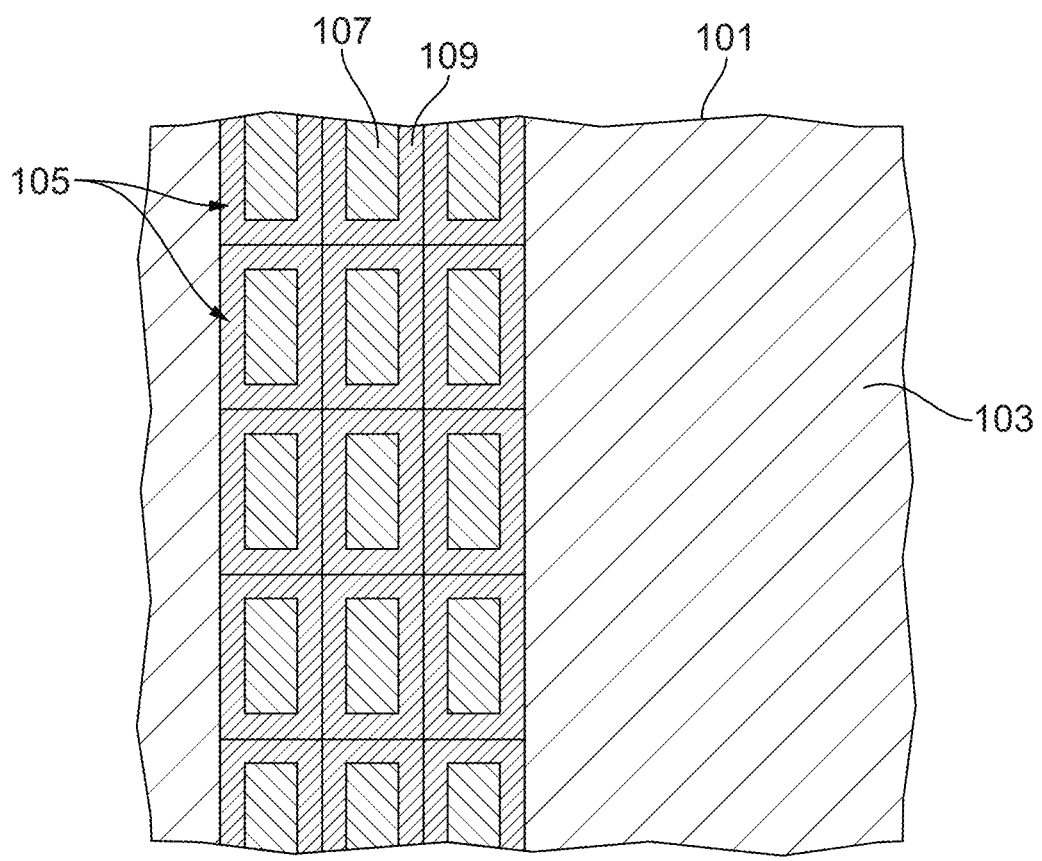
FIG. 2 is a partial cross-sectional plan view of the embodiment of FIG. 1.

Referring to FIGS. 1 and 2, an electrical machine stator 100 can include a stator core 101 having a stator core shape and made of a core material 103. The stator 100 can include a plurality of windings 105 disposed in the stator core 101 and made of a conductive material 107. The stator 100 can include an insulative material 109 surrounding the plurality of windings 105 and configured to electrically insulate each winding 105 from each other adjacent winding 105, and/or to insulate one or more of the windings 105 from the stator core 101. The insulative material 109 can be an amorphous metal, for example.

In certain embodiments, the amorphous metal can be a bulk metallic glass (BMG). The BMG can be amorphous steel, for example.

The stator core shape can define a plurality of apertures 111. Each aperture can contain the plurality of windings therein, for example.

In certain embodiment, the core material 103 can be or include steel or steel alloy. Any other suitable material (e.g., being or including iron) for the core material 103 is contemplated herein. As appreciated by those having ordinary skill in the art, the core material 103 can be conductive.

In certain embodiments, the conductive material 107 can be or include copper. Any other suitable conductive material 107 or combination of materials (e.g., being or including aluminum, iron, silver, etc.) is contemplated herein.

Figure 3A:
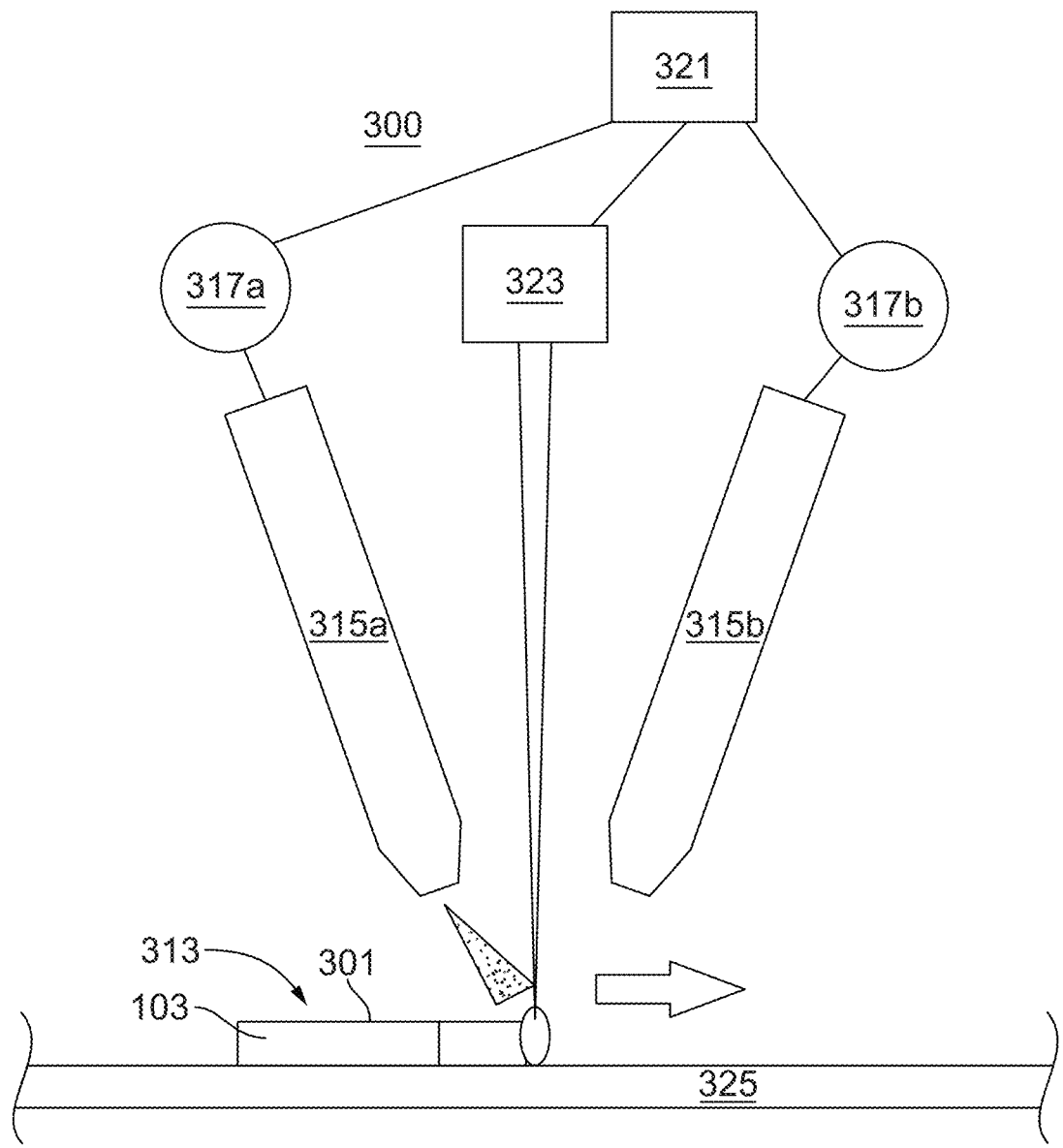
FIGS. 3A-3E illustrate an embodiment of a method in accordance with this disclosure.
Figure 3B:
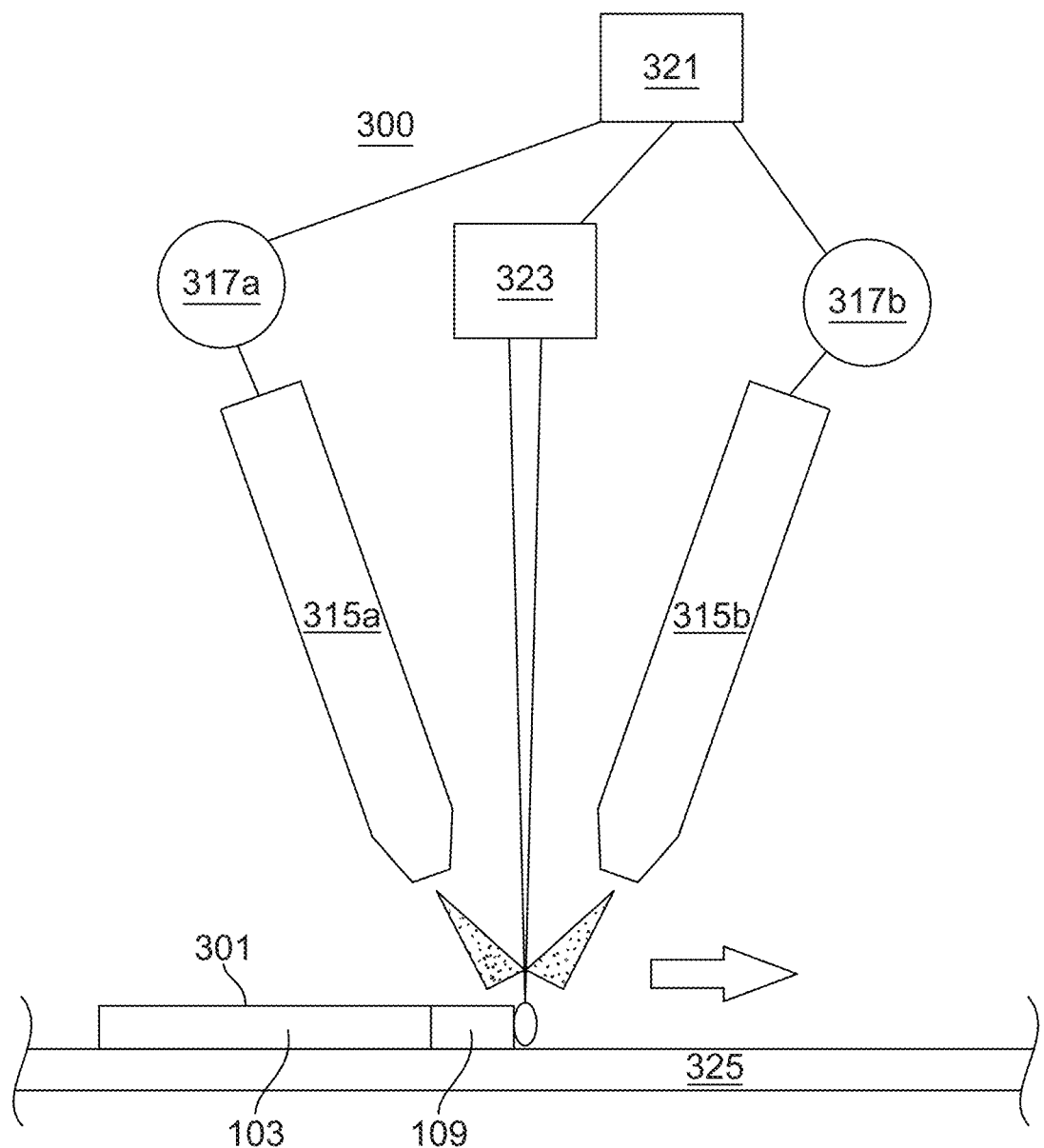
Figure 3C:
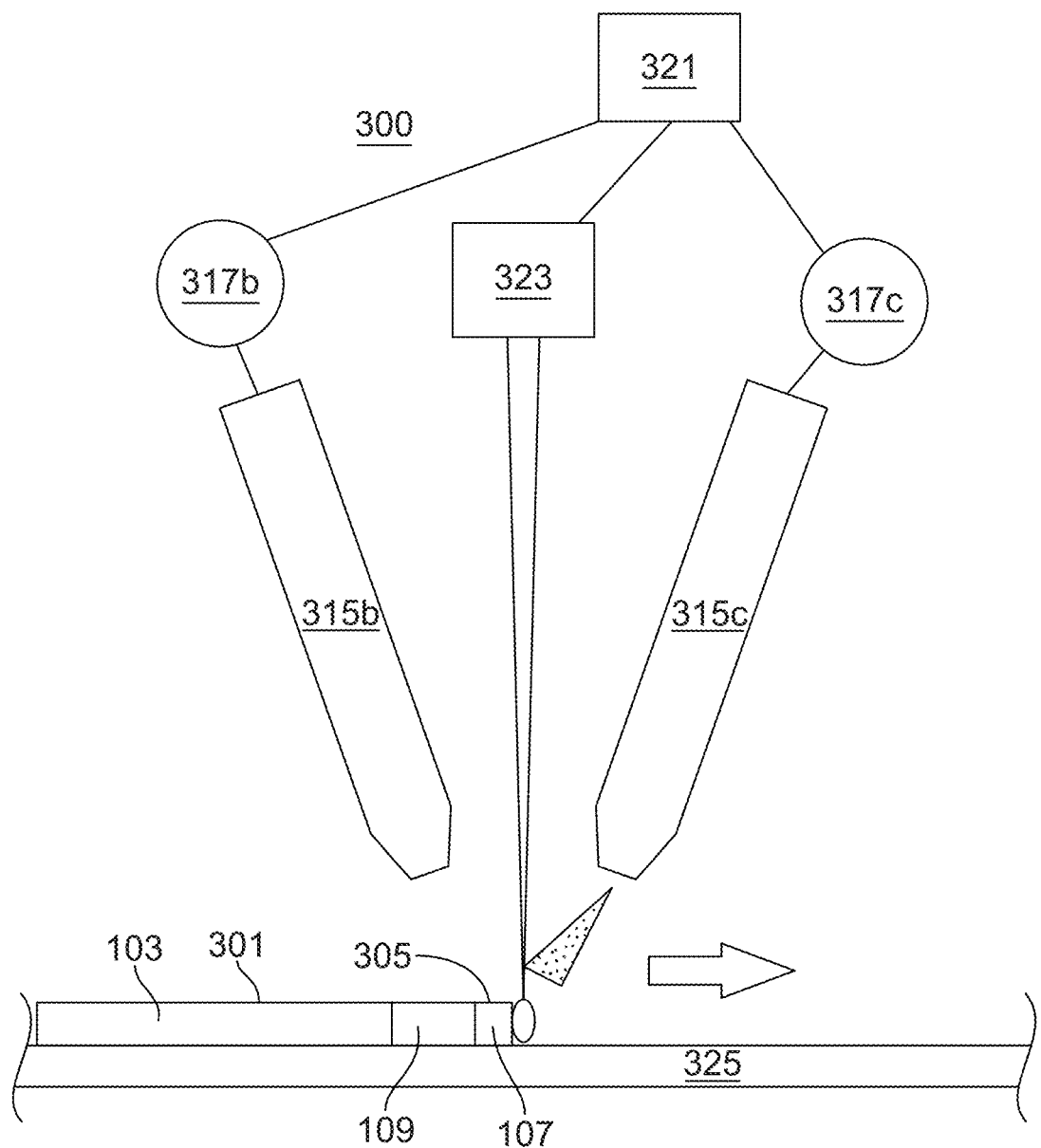
Figure 3D:
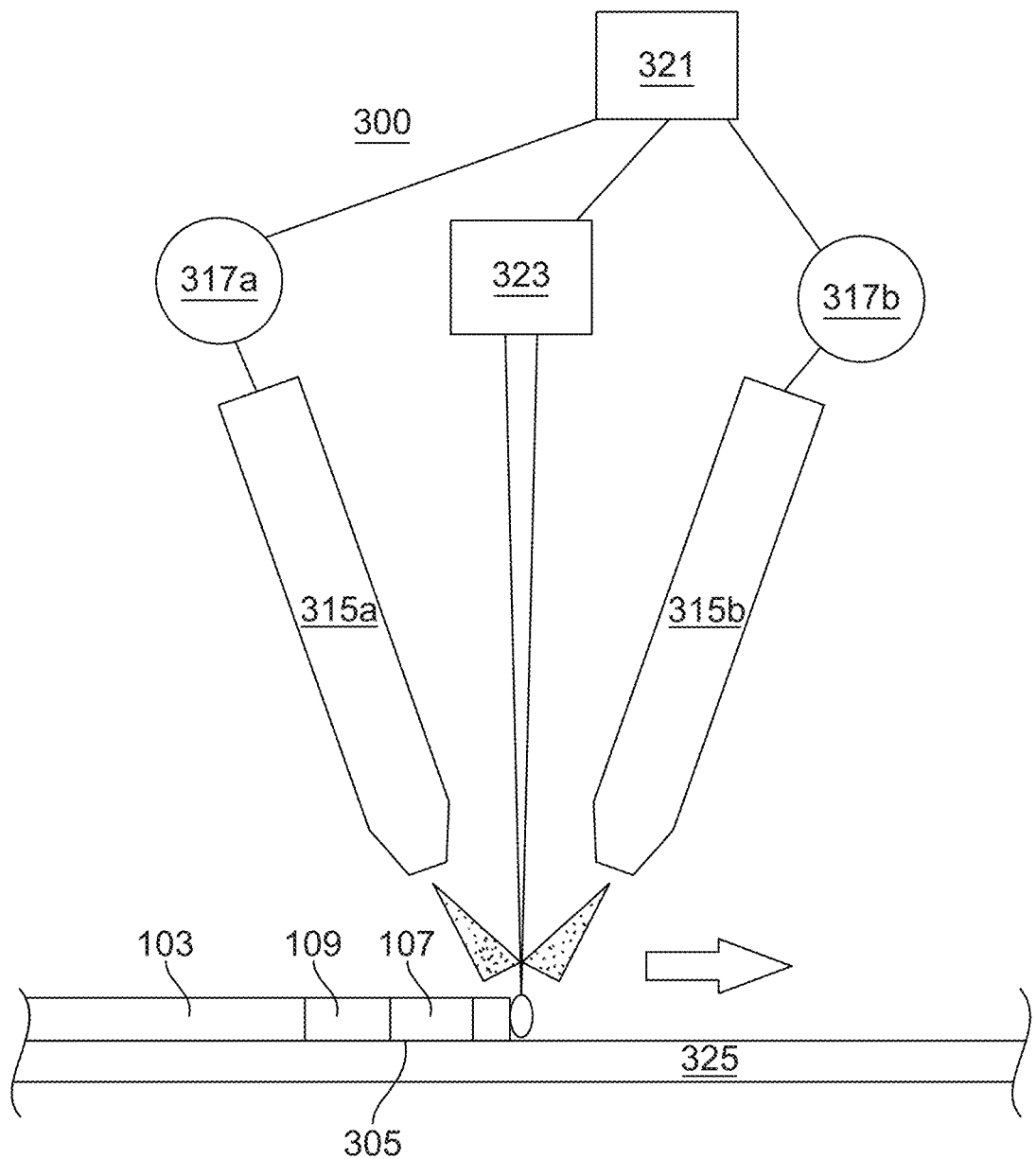
Figure 3E:
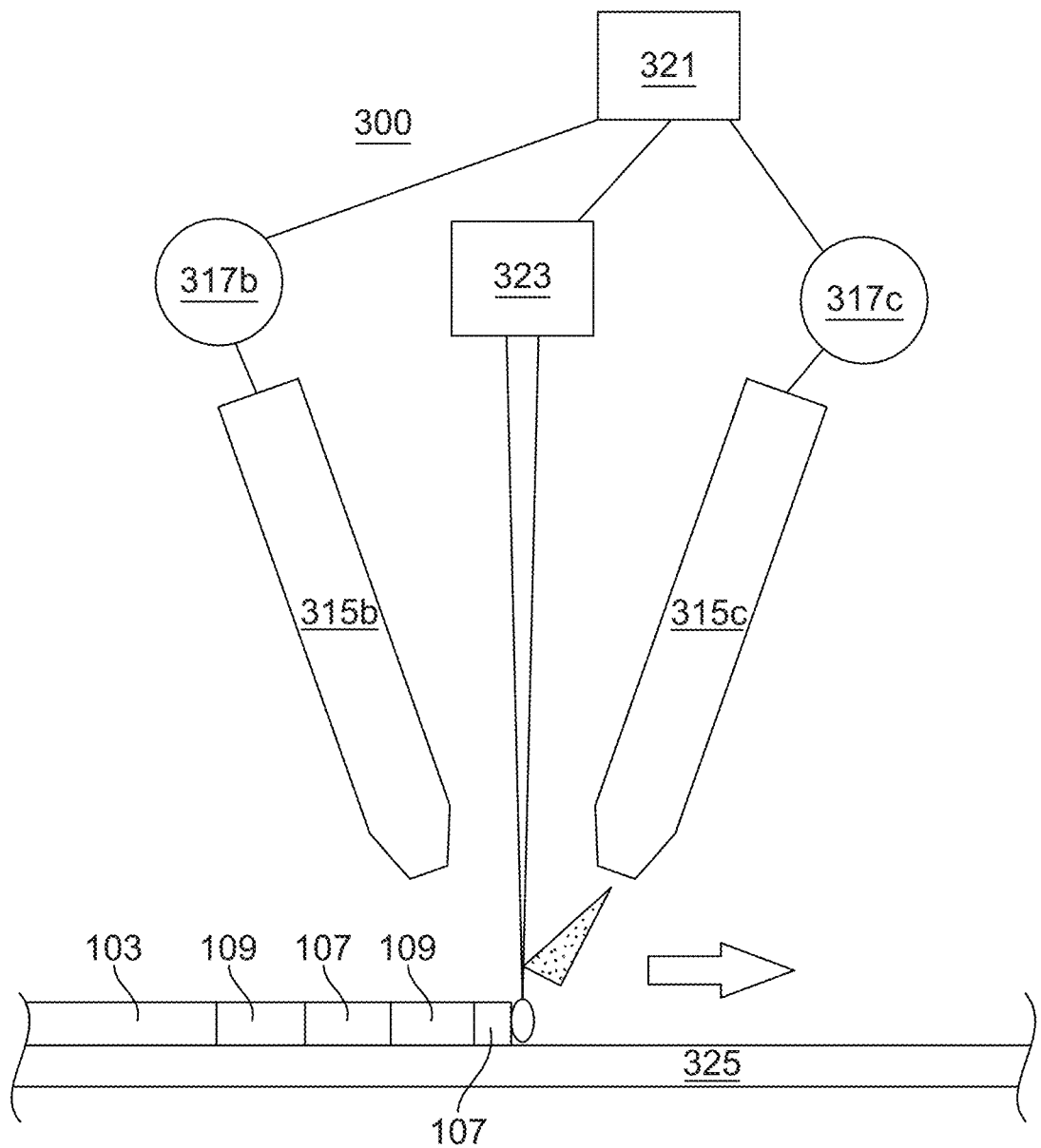

In accordance with at least one aspect of this disclosure, referring additionally to FIGS. 3A-3E, a method can include additively manufacturing at least one electrical machine stator layer 313 having a stator core portion 301 (e.g., as shown being made in FIG. 3A) having a stator core shape (e.g., a cross-sectional slice of stator core 101) and made of a core material 103. The method can include additively manufacturing a plurality of conductive material portions 305 (e.g., made of conductive material 107 as shown in FIG. 3C), and an electrically insulative material 109 surrounding each conductive material portion 305 (e.g., as shown in FIGS. 3B, 3D, and 3E) to electrically isolate the plurality of conductive material portions 305 from each adjacent conductive material portion 305 and/or to isolate one or more of the conductive portions 305 from the core material 103.

Additively manufacturing can include using a directed energy deposition system 300 comprising a plurality of nozzles (e.g., three nozzles 315a, 315b, 315c, only two of which are shown at a time in each of FIGS. 3A-3E for simplicity), connected to a plurality of build materials (e.g., a first material powder supply 317a, a second material power supply 317b, and a third material powder supply 317c). The first material powder supply 317a can include the core material 103, for example. The second material powder supply 317b can include an additive material configured to form an amorphous metal with the core material 103, for example. As shown in FIG. 3B, for example, the core material 103 and the additive material can be mixed to form the insulative material 109 in manufacture. Any suitable number of nozzles and build materials are contemplated herein (e.g., a separate nozzle for a premixed powder for forming insulative material 109).

The method can include controlling a proportion of the plurality of build materials output from each nozzle 315a, b, c and/or an energy application setting (e.g., laser power, laser pulse frequency) during additive manufacturing to create the core material 103, the conductive material portions 305, and the insulative material 109. For example, the DED system can include a controller 321 and an energy applicator 323 (e.g., a laser) configured to apply energy to a build area (e.g., to melt powder above and/or on a build plate 325). The controller 321 can include any suitable hardware and/or software module(s) configured to perform any suitable disclosed function and/or any other suitable function as appreciated by those having ordinary skill in the art in view of this disclosure. The controller 321 can be operatively connected to the energy applicator 323 and each powder supply 317a, b, c to control a powder flow to each nozzle 315a, b, c and to control the output of the energy applicator 323 (e.g., to pulse the laser).

The insulative material 109, the core material 103, and the conductive material 107 can be any suitable material as disclosed herein (e.g., as described above). For example, as shown in FIG. 3A, the controller 321 can be configured to cause a first nozzle 315a output a first powder (e.g., iron and/or an iron alloy such as steel) and to cause the energy applicator 323 to output a beam suitable to create a portion of the layer 300 defining a stator core portion 103 of the stator core 101 of FIGS. 1 and 2.

As shown in FIG. 3B, the controller 321 can be configured to additionally cause a second nozzle 315b to output a second powder (e.g., silicon) in a suitable proportion to mix with the first powder, and also to control the energy applicator 323 to output a suitable beam (e.g., a pulsed beam of certain power) to cause the formation of an amorphous metal). It is contemplated that, in certain embodiments, the controller 321 can include a physics based model to determine suitable characteristics of the power supply (e.g., flow rate) and the energy applicator characteristics (e.g., power, pulse rate, etc.) to provide the desired insulative material having an amorphous metal for example.

As shown in FIG. 3C, the controller 321 can be configured to cause a third nozzle 315c to output a third powder (e.g., copper) to form the conductive material portions 305. The process of FIGS. 3C and 3D can be repeated as necessary, e.g., as shown in FIGS. 3D and 3D. In certain embodiments, it is contemplated that only the core portion 301 and the insulating material 109 may be formed, and a conductive material may be inserted, e.g., after construction of the entire stator core 101 having insulating material 109 forming openings for the conductive material 107.

It is contemplated that one or more transitions between differing materials can include a gradient blending the two materials together to provide improved mechanical connection, for example. For example, the controller 321 can gradually reduce an amount of first powder and/or gradually add second powder when transitioning from the core portion 301 to the insulative material 109. The controller 321 can gradually reduce the amount of first powder and second powder while increasing an amount of third powder when transitioning from the insulative material to the conductive portions 305, for example. Any other suitable additional and/or separate control (e.g., laser modification) to cause a gradient is contemplated herein.

Figure 4:
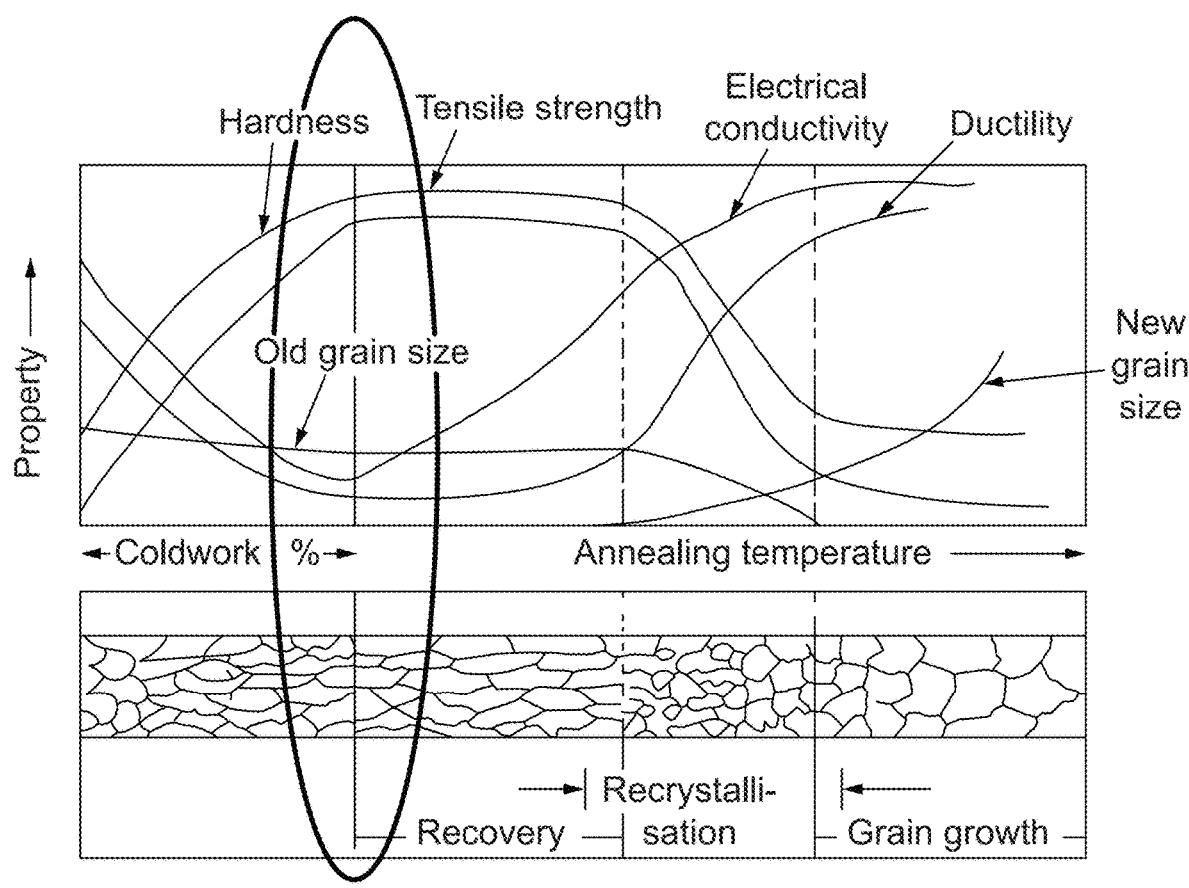
FIG. 4 is a chart showing the effect of cold working, recovery, recrystallization, grain growth on electrical and mechanical properties of metals.

Any other suitable deposition process and/or scan strategy different than that shown is also contemplated herein. Any other suitable multi-material process to additively manufacture the layer 300 and/or portions thereof is contemplated herein. In certain embodiments, e.g., referring additionally to FIG. 4, one or more layers 300 can be cold rolled (e.g., deep rolled) to provide a desired material characteristic (e.g., minimum conductivity). FIG. 4 shows the effect of cold work, recover, recrystallization, grain growth on electrical and mechanical properties of metals. Any other suitable material process for each layer or a plurality of layers is contemplated herein.

In certain embodiments, the entire stator 100 can be additively manufactured as one unitary structure. In certain embodiments, the stator 100 can be formed by laminating a plurality of layers 300 together.

In accordance with at least one aspect of this disclosure, an electrical machine lamination, e.g., layer 300 can include a stator core portion having a stator core shape and made of a core material, a plurality of conductive portions disposed in the stator core portion and made of a conductive material, and an insulative material surrounding the plurality of conductive portions and configured to electrically insulate each conductive portion from each adjacent conductive portion, and/or to insulate each conductive portion from the stator core portion. The insulative material can be an amorphous metal. The insulative material, the core material, and the conductive material can be any suitable material as disclosed herein (e.g., as described above). The lamination can be configured to be bonded together with one or more other laminations to form a stator core.

In certain embodiments, Iron-Silicon BMG can act as an excellent insulator up to about 500 degrees C., for example. Embodiments can allow using only additive manufacturing to create an entire sheet that can be laminated, and/or a complete stator, with BMG in certain locations. In certain embodiments wires forming windings, e.g., from copper, can be formed integrally, which provides more flexibility in shape of wire cross-section and winding pattern.

Embodiments can include a hybrid based pulsed directed energy deposition (DED) fabrication of customized bulk metal glass for electrical machine (EM) applications, for example. Embodiments can include a hybrid DED and deep rolling (DR) processes that can be used to fabricate EM stator with amorphous steel (AS) replacing current insulators is proposed. AS can be produced by depositing multiple powders of AS alloy elements using multiple feeders and process parameters that promote high cooling rate that results in generating AS. Embodiments can be utilized to control the grain size and directionality (e.g., a shown in FIG. 5, which is 6% silicon iron alloy) and stress state to obtain controlled wrought properties of the laminates and/or complete stator structure. A pulsed laser with controlled scan strategy (e.g., about 285 W and about 960 mm/s) can be used to create amorphous microstructure. A model driven process map can be used by the controller to create a steel laminate with large grain in the radial direction, for example. As can be visualized in FIG. 1, forming radially-oriented grains in the radial teeth portion of the core stator core 103 and forming circumferentially-oriented grains in the outer yoke within the stator core 103 offers an advantage in the ability to efficiently transfer magnetic flux as compared to stator designs made up of traditional iron laminates with a non-oriented grain structure. Wires/windings (e.g., made of copper) can be deposited in grooves followed by the deposition of AS insulator, or vice versa. Being able to have a near perfect winding coil fit in available area can provide an advantage in regards to optimized current density.

Also with additive, being able to intentionally leave 'unprinted' volumes down the center of the slots and/or laminations for example to serve as cooling channels (air, oil, etc.) could be a huge benefit in regards to improved heat rejection and help solve all of the manufacturing challenges associated with including cooling channels that are close proximity with the Embodiments can include a DED process with multiple powder feeders that can vary the composition and parameters at different region of the electric machine component. Embodiments can employ model guided parameters along with a pulsed DED process to create amorphous steel, for example, that has a lower electrical conductivity replacing insulation material. Embodiments can use a pulsed DED to fabricate the laminates using high silicon iron that allow directional radial grain (e.g., shown in FIG. 5).

Silicon can be generally used as an insulator and has resistivity of about 640 Ohm-m and the conductivity is about 0.0015625 S/m. Plastic and polymer insulators resistivity is about $10^{16}$ Ohm-m and conductivity is about $10^{-16}$ S/m. However, the insulation resistance of most plastics is affected by temperature and the relative humidity of the atmosphere. The insulation resistance falls off appreciably with an increase in temperature or humidity beyond 250 degrees C. Under these conditions, polymers like PTFE and PCTFE are more suitable, however, the presence of fillers in the polymer will affect the volume resistivity. The type and amount of filler change the volume resistivity. Even PS, which has very high insulation resistance at room temperature, becomes generally unsatisfactory above 80° C. (176° F.), for example.

Certain embodiments utilizing BMG can reduce conductivity by three orders of magnitude, so the conductivity can be about $0.1*10^3$ S/m. Further to that, reduction in conductivity can be obtained through local microstructure control obtained by pulsed laser and associated physics-based modeling of microstructure and properties while utilizing the available motor design techniques.

Embodiments can create thin gauge laminations to help minimize the losses attributed to eddy currents. Common thickness is about 0.014 inches, but certain, e.g., high frequency, electric machines benefit with thinner gage (e.g., about 0.007 inches or about 0.005 inches for example). These thin gauge laminations can offer reduced losses but can be difficult to work with during manufacture and can be easily prone to damage. In certain embodiments, the entire stator can be formed using the DED machine or laminations can be removed and separate bonded.

Figure 5:
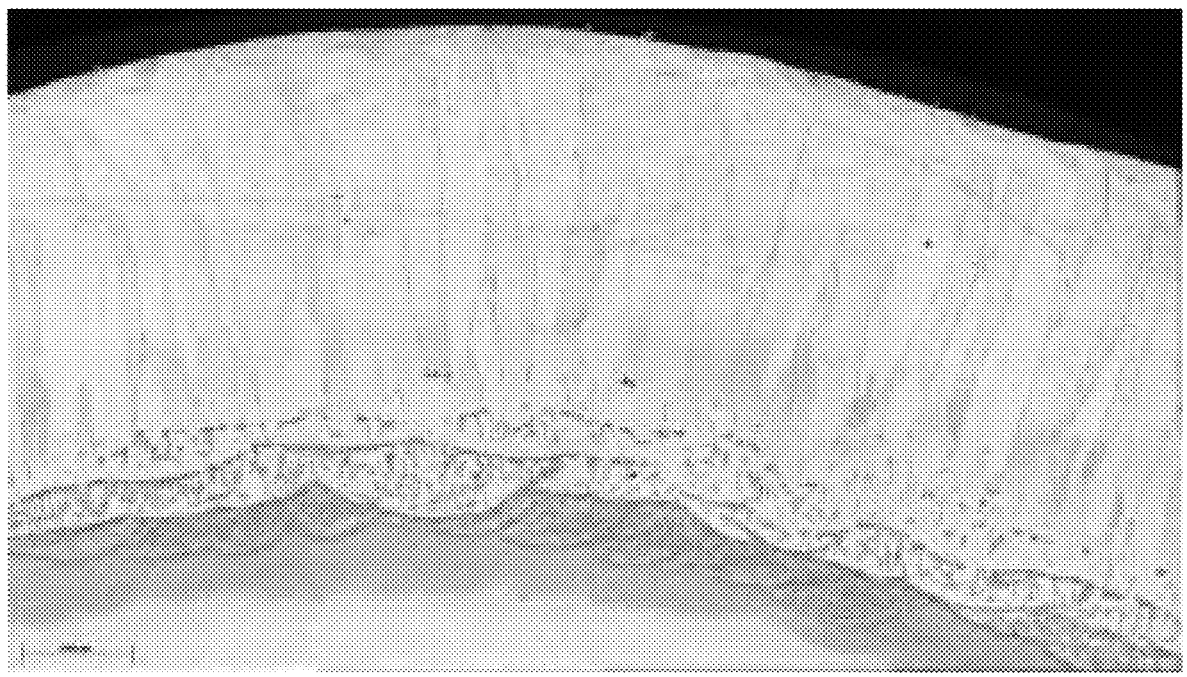
FIG. 5 shows a deposited radial grain growth of an embodiment of a material in accordance with this disclosure.

In certain embodiments, a controller can select the steel alloy that will facilitate the generation of the amorphous steel, define the elements in the alloy, identify the different powders of these elements and the number of feeders required to make the alloy, and predict the powder deposition rate for each feeder to achieve the exact element percentile in the alloy. The controller can use physics based models of the pulsed laser DED process to create and use guided parameters that promote faster cooling rate, resulting in amorphous steel in the region. In addition, a hybrid processes such as combination of DED and ultrasonic deep rolling process can be utilized to control the microstructures (e.g., grain size and grain orientation) and stress state resulting in higher level of control on properties such as fatigue strength, lifting, and adhesion. In certain embodiments, an ultrasonic transducer can be attached to the build plate 325 to provide ultrasonic vibration during directed energy deposition to achieve the desired effect (e.g., as shown in FIGS. 4 and 5).

Embodiments can utilize a pulsed laser with a controlled scan strategy can be used to create an amorphous microstructure. Embodiments can use a physics-driven model assisted process map to create a functionally graded structure for steel laminates, for example, where the steel grain orientation is in the radial direction, e.g., as shown in FIG. 5. The steel laminate can be deposited with grooves/apertures that can include the copper coils arrangement and the positions of the insulator, e.g., as shown in FIGS. 1 and 2. Copper powder can be deposited in the grooves to generate the coils/windings for example.

The pulsed laser can fabricate an amorphous matrix through phase field-model predicted process region where cooling rate is higher than about 105-106 K/s for example. In certain embodiments, one or more (e.g., an arrangement of) transducers (e.g., connected to the controller 321) can be included in build platform 325 to induce crystalline transition locally by ultrasonic vibration. The insulating bulk glass can also be made separately and then press-fitted into the apertures for example.

Embodiments can provide a single step fabrication of an electrical machine stator. Embodiments can replace polymer insulation by amorphous steel (low electrical conductivity), allow increase the operating temperature, prevent insulator degradation, provide cost effective fabrication of complex geometry, provide thinner laminate thickness for low core loss, provide better thermal management and heat rejection by leaving unprinted volumes for cooling channels (e.g., forming cooling channels in the stator core), and used in applications where high temperature and dielectric capability is required. Embodiments can provide a single step efficient fabrication method of electric machine components with optimized resistivity, durability and strength while enabling operation at higher temperature than traditional devices.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An electrical machine stator, comprising:
   a stator core having a stator core shape and made of a core material;
   a plurality of windings disposed in the stator core and made of a conductive material; and
   an insulative material surrounding the plurality of windings and configured to electrically insulate each winding from each other adjacent winding, and/or to insulate one or more of the windings from the stator core, wherein the insulative material is an amorphous metal.

2. The stator of claim 1, wherein the amorphous metal is a bulk metallic glass (BMG).

3. The stator of claim 2, wherein the BMG is amorphous steel.

4. The stator of claim 1, wherein the stator core shape defines a plurality of apertures, each aperture containing the plurality of windings therein.

5. The stator of claim 1, wherein the core material is or includes steel or steel alloy.

6. The stator of claim 1, wherein the conductive material is or includes copper.

7. A method, comprising:
   additively manufacturing at least one electrical machine stator layer including:
   a stator core portion having a stator core shape and made of a core material;
   a plurality of conductive material portions; and
   an electrically insulative material surrounding each conductive material portion to electrically isolate the plurality of conductive material portions from each adjacent conductive material portion and/or to isolate one or more of the conductive portions from the core material, wherein additively manufacturing includes using a directed energy deposition system comprising a plurality of nozzles connected to a plurality of build materials, further comprising controlling a proportion of the plurality of build materials output from each nozzle and/or an energy application setting during additive manufacturing to create the core material, the conductive material portions, and the insulative material, wherein the insulative material is an amorphous metal.

8. The method of claim 7, wherein the insulative material is a bulk metallic glass (BMG).

9. The method of claim 8, wherein the BMG is amorphous steel.

10. The method of claim 9, wherein the core material is normal steel or a normal steel alloy.

11. The method of claim 10, wherein the conductive material portion is made of copper.

12. An electrical machine lamination, comprising:
    a stator core portion having a stator core shape and made of a core material;
    a plurality of conductive portions disposed in the stator core portion and made of a conductive material; and
    an insulative material surrounding the plurality of conductive portions and configured to electrically insulate each conductive portion from each adjacent conductive portion, and/or to insulate each conductive portion from the stator core portion, wherein the insulative material is amorphous metal.

13. The lamination of claim 12, wherein the amorphous metal is a bulk metallic glass (BMG).

14. The lamination of claim 13, wherein the BMG is amorphous steel.

15. The lamination of claim 12, wherein the stator core shape defines a plurality of apertures, each aperture containing the plurality of windings therein.

16. The lamination of claim 12, wherein the core material is or includes steel or steel alloy.

17. The lamination of claim 12, wherein the conductive material is or includes copper.

* * * * *